J. C. BARBER.
ROLLER CENTER BEARING FOR CARS.
APPLICATION FILED NOV. 1, 1912.

1,130,956.

Patented Mar. 9, 1915.

Witnesses:
Geo. Knutson
E. C. Skinkle

Inventor:
John C. Barber
By his Attorneys:
Williamson Merchant

UNITED STATES PATENT OFFICE.

JOHN C. BARBER, OF CHICAGO, ILLINOIS, ASSIGNOR TO STANDARD CAR TRUCK COMPANY, OF CHICAGO, ILLINOIS, A CORPORATION OF NEW JERSEY.

ROLLER CENTER-BEARING FOR CARS.

1,130,956.  Specification of Letters Patent.  Patented Mar. 9, 1915.

Application filed November 1, 1912. Serial No. 729,035.

*To all whom it may concern:*

Be it known that I, JOHN C. BARBER, a citizen of the United States, residing at Chicago, in the county of Cook and State of Illinois, have invented certain new and useful Improvements in Roller Center-Bearings for Cars; and I do hereby declare the following to be a full, clear, and exact description of the invention, such as will enable others skilled in the art to which it appertains to make and use the same.

My invention has for its object to provide an improved roller center bearing for cars; and to such ends, generally stated, the invention consists of the novel devices and combinations of devices hereinafter described and defined in the claim.

In the accompanying drawings which illustrate the invention, like characters indicate like parts throughout the several views.

Figure 2:
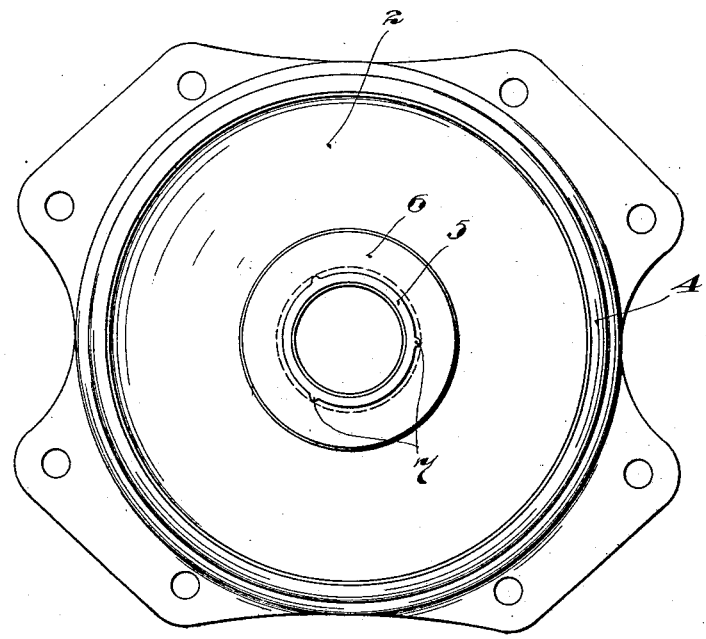
Figure 1:
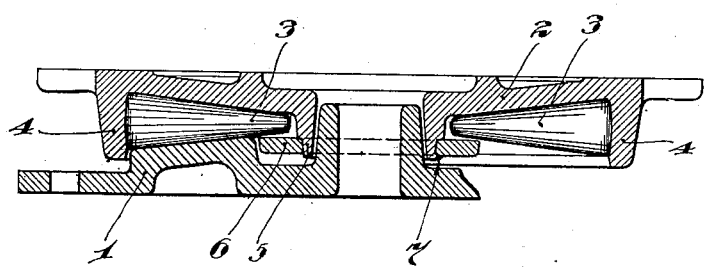

Referring to the drawings, Figure 1 is a vertical section taken centrally through the improved center bearing; and Fig. 2 is a bottom plan view of the upper roller bearing plate with the rollers removed therefrom.

It may be here stated that this invention has for its particular object, an improved center bearing in which the center bearing plates may be made in the form of drop forgings.

The numeral 1 indicates the lower bearing plate which is adapted to be secured to the bolster or other part of a car truck.

The numeral 2 indicates the upper bearing plate which is adapted to be secured to the body bolster or other part of the car body. The two plates have telescoping hubs of the proper construction to admit of the use of a king bolt, not shown.

The numeral 3 indicates the conical rollers which are radially disposed between the tread surface of the two plates. The upper plate 2 is provided with an outer depending thrust flange 4 partly disposed to afford an abutment for the outer or larger ends of the rollers 3. Below the small or inner ends of the rollers 3, the hub of the upper bearing plate 2 is externally reduced in diameter to form a relatively thin annular portion 5 that is adapted to be quite easily upset.

Fitted on this reduced portion 5 is a lower retaining ring 6 below which the thin annular portion 5 projects slightly, as shown, in Fig. 1.

After the rollers have been placed in position in respect to the upper roller bearing plate, the thin annular hub portion 5 is upset or bent over, preferably at several points only so as to afford a plurality of retaining lips 7, shown at the right in Fig. 1; and in plan in Fig. 2. The retaining ring 6, when applied as stated, projects and underlaps the small inner ends of the rollers 3 to such an extent that it has a pocketing action thereon, which will prevent the rollers from dropping out of their seats in the upper bearing plate. Otherwise stated, the said retaining ring interlocks the said rollers to the said bearing plate with freedom for rotary and traveling movements in respect thereto.

With the hubs of the other parts of the bearing plates constructed, as shown and described, they are capable of being produced in the form of drop forgings. Furthermore, the parts may be very easily and quickly assembled and the construction is strong and durable.

What I claim is:

In a roller bearing, the combination with a bearing plate and radially disposed conical rollers interposed between the same, one of said bearing plates having a thrust flange engageable with the outer ends of the rollers and having a hub that is located entirely inward of the inner ends of said rollers, and a separately formed retaining ring secured to said hub and lapping the inner ends of said rollers and directly engageable therewith to secure said rollers to said bearing plate with freedom for rotary and traveling movements in respect thereto, the radial distance between the said thrust flange and the outermost portion of said hub being greater than the length of said rollers.

In testimony whereof I affix my signature in presence of two witnesses.

JOHN C. BARBER.

Witnesses:
LEE W. BARBER,
C. F. PHILIPPS.

Copies of this patent may be obtained for five cents each, by addressing the "Commissioner of Patents, Washington, D. C."